US007979464B2

(12) United States Patent
Seidel

(10) Patent No.: US 7,979,464 B2
(45) Date of Patent: Jul. 12, 2011

(54) ASSOCIATING RIGHTS TO MULTIMEDIA CONTENT

(75) Inventor: Craig H. Seidel, Palo Alto, CA (US)

(73) Assignee: Motion Picture Laboratories, Inc., Palo Alto, CA (US)

( * ) Notice: Subject to any disclaimer, the term of this patent is extended or adjusted under 35 U.S.C. 154(b) by 697 days.

(21) Appl. No.: 11/734,015

(22) Filed: Apr. 11, 2007

(65) Prior Publication Data

US 2008/0209502 A1     Aug. 28, 2008

Related U.S. Application Data

(60) Provisional application No. 60/891,764, filed on Feb. 27, 2007.

(51) Int. Cl.
*G06F 17/30* (2006.01)
*G06F 21/00* (2006.01)

(52) U.S. Cl. ............ 707/781; 707/782; 707/999.009; 707/999.107; 713/186

(58) Field of Classification Search .......... None
See application file for complete search history.

(56) References Cited

U.S. PATENT DOCUMENTS

| 6,229,931 | B1 |   | 5/2001  | Essafi et al. ........... 382/305 |
| 6,622,247 | B1 | * | 9/2003  | Isaak .................... 713/155 |
| 6,642,929 | B1 |   | 11/2003 | Essafi et al. ........... 345/581 |
| 6,668,246 | B1 | * | 12/2003 | Yeung et al. ............ 705/57 |
| 7,003,131 | B2 | * | 2/2006  | Watson et al. .......... 382/100 |
| 7,134,020 | B2 | * | 11/2006 | Eagle et al. ............ 713/176 |
| 7,369,677 | B2 | * | 5/2008  | Petrovic et al. ........ 382/100 |
| 2003/0026479 | A1 |   | 2/2003 | Thomas et al. .......... 382/173 |
| 2003/0028796 | A1 |   | 2/2003 | Roberts et al. .......... 713/193 |
| 2003/0078890 | A1 | * | 4/2003 | Schmidt et al. ......... 705/51 |

(Continued)

FOREIGN PATENT DOCUMENTS

WO    WO 2005/041455 A1    5/2005

(Continued)

OTHER PUBLICATIONS

Kasutani E. et al. "Linking TV Programs with Internet Contents based on Video Fingerprinting" Consumer Electronics. 2006. ICCE '06. 2006 Digest of Technical Papers. International Conference on Las Vegas, NV, USA Jan. 7-11, 2006, Piscataway, NJ, USA, IEEE, Jan. 7, 2006, pp. 203-204, XP010896575.

(Continued)

*Primary Examiner* — Miranda Le
(74) *Attorney, Agent, or Firm* — Dov Rosenfeld; Inventek

(57) ABSTRACT

A method and software to implement a method comprising receiving digital content such as multimedia content, and either ascertaining whether at least a part of the digital content has previously been associated with one or more matched referenced works or searching a store of fingerprint data of referenced works for a match. The searching includes determining a fingerprint of at least part of the digital content, e.g., multimedia content; and searching the store of fingerprint data of referenced works for a match. In the case that is has been ascertained that the work has previously been associated, or the searching has produced a match to one or more matched referenced works, associating association data to the one or more matched referenced works. Ownership data to the matched referenced works is included in the association such that use of the digital content can take into account such ownership rights. The associating of the association data is carried out in a secure manner.

15 Claims, 6 Drawing Sheets

U.S. PATENT DOCUMENTS

| | | | |
|---|---|---|---|
| 2003/0086341 A1 | 5/2003 | Wells et al. | 369/13.56 |
| 2003/0101164 A1 | 5/2003 | Pic et al. | 707/1 |
| 2003/0105739 A1 | 6/2003 | Essafi et al. | 70/1 |
| 2003/0113017 A1 | 6/2003 | Thomas et al. | 382/181 |
| 2003/0126147 A1 | 7/2003 | Essafi et al. | 707/100 |
| 2004/0073803 A1* | 4/2004 | Keramane | 713/186 |
| 2004/0078575 A1* | 4/2004 | Morten et al. | 713/176 |
| 2004/0131255 A1 | 7/2004 | Ben-Yaacov et al. | 382/190 |
| 2004/0236717 A1* | 11/2004 | Demartini et al. | 707/1 |
| 2004/0267390 A1 | 12/2004 | Ben-Yaacov et al. | 700/94 |
| 2005/0065624 A1 | 3/2005 | Ben-Yaacov et al. | 700/94 |
| 2005/0125087 A1 | 6/2005 | Ben-Yaacov et al. | 700/94 |
| 2005/0273612 A1* | 12/2005 | Van Der Veen et al. | 713/176 |
| 2006/0103732 A1 | 5/2006 | Bateman | 348/208.2 |
| 2006/0107330 A1 | 5/2006 | Ben-Yaacov et al. | 726/26 |
| 2006/0285172 A1* | 12/2006 | Hull et al. | 358/448 |
| 2007/0033163 A1 | 2/2007 | Epstein et al. | 707/3 |
| 2008/0005802 A1* | 1/2008 | Fierstein et al. | 726/27 |
| 2008/0066185 A1* | 3/2008 | Lester et al. | 726/27 |
| 2008/0130058 A1* | 6/2008 | Cheng | 358/3.28 |

FOREIGN PATENT DOCUMENTS

| | | |
|---|---|---|
| WO | WO 2005/055086 A1 | 6/2005 |
| WO | WO 2005/064885 A1 | 7/2005 |
| WO | WO 2006/134310 A2 | 12/2006 |

OTHER PUBLICATIONS

Karthik K. et al. "Video Fingerprinting and Encryption Principles for Digital Rights Management" Proceedings of the IEEE, IEEE. New York, US. vol. 92, No. 6, Jun. 1, 2004, pp. 918-932, XP011112769.

PCT International Search Report on PCT Application PCT/US2008/054799.

PCT International Preliminary Report on Patentability on PCT Application PCT/US2008/054799.

Rakesh Mohan, "Video sequence matching," Proceedings of the 1998 IEEE International Conference on Acoustics, Speech and Signal Processing ICASSP '98, vol. 6, pp. 3697-3700.

Kasutani, E. Iwamoto, K. Yamada, A., "Linking TV programs with Internet contents based on video fingerprinting," 2006 Digest of Technical Papers. International Conference on Consumer Electronics, 2006. ICCE '06, pp. 203-204, Jan. 7-11, 2006.

Bill Rosenblatt, "Audible Magic Branches Out into Video Fingerprinting," published online by DRM Watch on Nov. 30, 2006 at http://www.drmwatch.com.

An Overview of Digital Data Exchange, LLC, (DDEX), retrieved Jun. 8, 2007 from http://www.ddex.net/Comms-0053—DDEX_Overview(070516-final).pdf.

S. Cheung, and A. Zakhor, "Fast Similarity Search and Clustering of Video Sequences on the World-Wide-Web", IEEE Transactions on Multimedia, vol. 7, No. 3, Jun. 2005, pp. 524-537.

Dublin Core Metadata Initiative, "Making Information Work: the Dublin Core Way,"), retrieved on Jun. 8, 2007 from http://dublincore.org/resources/presentations/Dublin_Core_overview_2007.pdf.

"Meet 'Johnny,' The MPAA's New Tool to Fight Piracy," published online by ExtremeTech on Jul. 21, 2006, www.extremetech.com.

S. Cheung and A. Zakhor, "Fast Similarity Search on Video Signatures" in International Conference on Image Processing 2003, Barcelona, Spain, vol. 3, pp. II-1-4, Sep. 2003.

FAQ from (Frequently Asked Questions) from inDplay, Inc., 3000 Bridge Parkway Ste 200-201, Redwood Shores, CA 94065, Rerieved Jun. 8, 2007 from https://www.indplay.com/faqs.

Ed Sutherland, "MySpace Adds Video Fingerprinting," published online at InternetNews.com on Feb. 12, 2007. See www.internetnews.com.

Brad Stone and Miguel Helft, "New Weapon in Web War Over Piracy," New York Times, Feb. 19, 2007. Available at www. NYT.com.

"Video Fingerprinting," by Philips Content Identification, Eindhoven, The Netherlands.

"Products and Services" from Shazam, Charles House 4th Floor, Block F, 375 Kensington High St, London W148QH, UK, retrieved as a PDF from <http://www.shazam.com/music/portal/sp/s/media-type/html/user/anon/page/default/template/pages/p/company_product.html>.

Bill Rosenblatt, "Two Fingerprints:Audible Magic to Integrate with Activated Content," published online by DRM Watch on Oct. 5, 2005 at http://www.drmwatch.com.

University of St Andrews, "Video Fingerprinting Technology," retrieved as a PDF from < http://sta-res.st-andrews.ac.uk/DownloadsPublic/NCDs/NCD%20VIDEO%20FINGERPRINTING%20C.pdf>.

Baris Coskun, Bulent Sankur, and Nasir Memon, "Spatio—Temporal Transform Based Video Hashing," IEEE Transactions on Multimedia, vol. 8, No. 6, pp. 1190-1208, Dec. 2006.

S. Cheung, A. Zakhor, "Efficient Video Similarity Measurement With Video Signature" in IEEE Transactions on Circuits and Systems for Video Technology, vol. 13, No. 1, Jan. 2003, pp. 59-74.

* cited by examiner

ASSOCIATING RIGHTS TO MULTIMEDIA CONTENT

RELATED APPLICATION

The present invention claims benefit of priority of and is a conversion of U.S. Provisional Patent Application Ser. No. 60/891,764 filed Feb. 27, 2007 to inventor Seidel. The contents of such U.S. Provisional Patent Application No. 60/891,764 are incorporated herein by reference.

FIELD OF INVENTIONS

The present disclosure is related generally to digital rights management for multimedia content.

BACKGROUND

There is a need in the art for a method of asserting that a party has rights to an item of multimedia content.

User-generated multimedia content websites such as YouTube (see www.youtube.com) are known. Often a user includes one or more multimedia content elements owned by a third party, i.e., not the user or the operator of the user-generated multimedia content website. Currently, the primary means an owner of such multimedia content elements has to exercise its rights on such multimedia content is to force removal of the multimedia content, e.g., force the operator of the user-generated multimedia content website to remove such multimedia content. This is not satisfactory to any of the parties. For example, it would be desirable for the multimedia content owner to be able to be paid for such use of the one or more multimedia content elements, e.g., for playback or for any other use.

SUMMARY

Embodiments of the present invention include a method, and apparatus, and logic encoded in one or more computer-readable tangible medium to carry out a method. The method is to associate association data, including ownership data with digital content such as multimedia content.

One embodiment includes a method comprising receiving digital content, e.g., multimedia content or a digital game, and either ascertaining whether at least a part of the digital content has previously been associated with one or more matched referenced works or searching a store of fingerprint data of referenced works for a match. The searching includes determining a fingerprint of at least part of the multimedia content; and searching the store of fingerprint data of referenced works for a match. In the case that it has been ascertained that the work has previously been associated, or the searching has produced a match to one or more matched referenced works, associating association data to the one or more matched referenced works. Ownership data to the matched referenced works is included in the association such that use of the digital content can take into account such ownership rights.

In one embodiment, the associating of the association data is carried out in a secure manner.

In one embodiment, the searching for a match produces a match for content that has been modified.

One embodiment includes a method comprising receiving digital content, e.g., multimedia content; determining a fingerprint of the digital content; and storing the determined fingerprint in a store of fingerprinted works that is searchable, such that an unknown work can be searched by fingerprint in the store in order to associate association data with the unknown work in the case that the search produces a match to one or more matched works, wherein the association data includes rights information or a reference thereto, and wherein the associating is carried out in a secure manner.

One embodiment includes a method comprising receiving digital content, e.g., multimedia content; ascertaining whether association data including ownership data has previously been associated to the received digital content; in the case it is ascertained that there has not been association data including ownership data previously associated, searching for matches of one or more referenced works; and, in the case that the search results in one or more matched referenced works, forming association data including ownership data, and associating the formed association data to the received digital content.

In one embodiment, the ascertaining includes locally ascertaining whether association data including ownership data has previously been associated; and in the case the locally ascertaining ascertains that there has not been association data including ownership data previously associated, generating an associable reference of the received digital content, and submitting the associable reference to a remote service to remotely ascertain whether association data including ownership data has previously been associated. The searching for matches and the forming association data is carried out remotely.

One embodiment includes a computer-readable carrier medium configured with instructions that when executed by one or more processors cause carrying out a method comprising: receiving digital content, e.g., multimedia content, and either ascertaining whether at least a part of the digital content has previously been associated with one or more matched referenced works or searching a store of fingerprint data of referenced works for a match. The searching includes determining a fingerprint of at least part of the digital content; and searching the store of fingerprint data of referenced works for a match. In the case that is has been ascertained that the work has previously been associated, or the searching has produced a match to one or more matched referenced works, associating association data to the one or more matched referenced works. Ownership data to the matched referenced works is included in the association such that use of the digital content can take into account such ownership rights.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

DESCRIPTION OF EXAMPLE EMBODIMENTS

Figure 1:
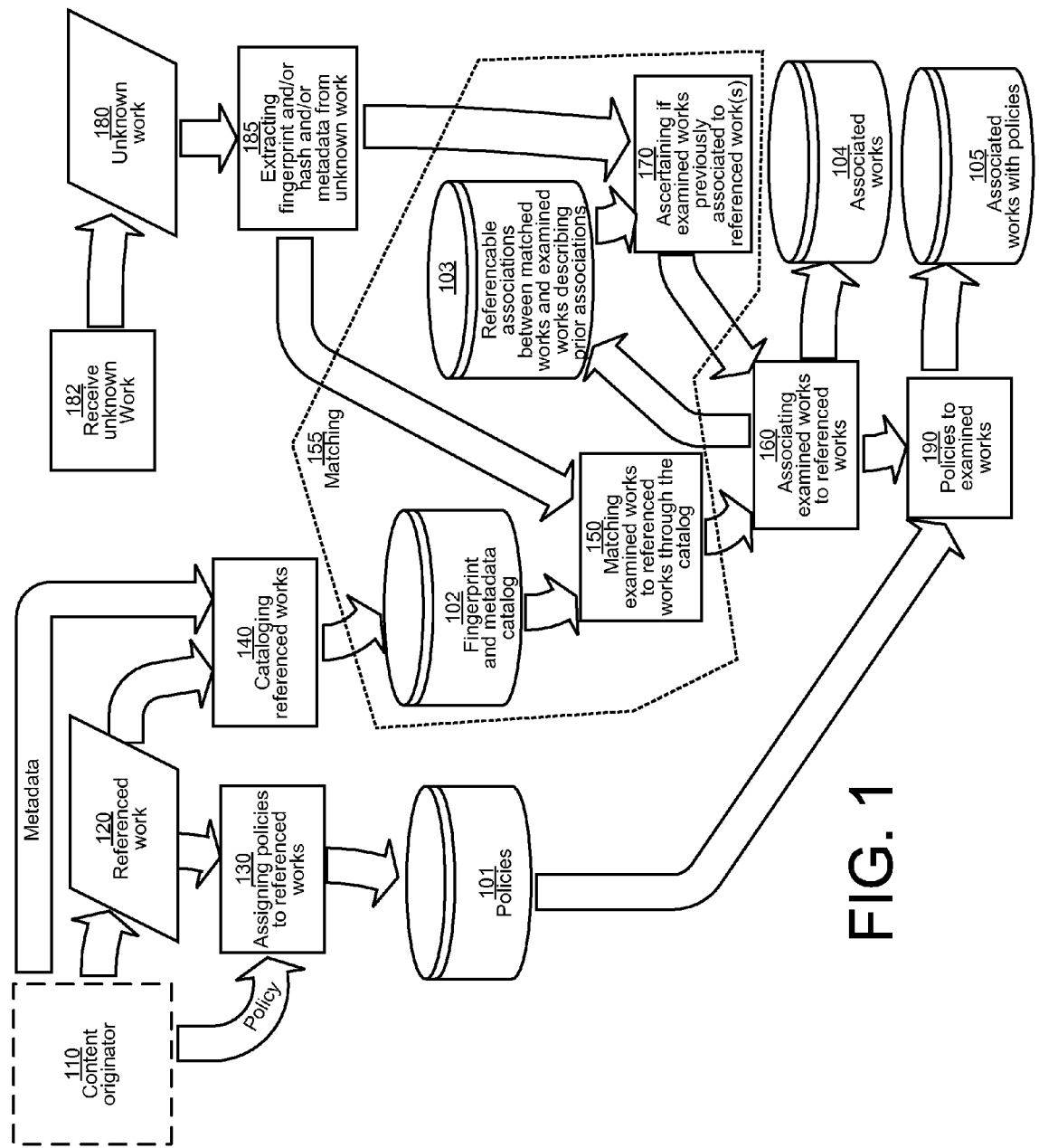
FIG. 1 shows the data flow of one embodiment of the invention.

This disclosure describes a method and an apparatus for associating data to digital content such as multimedia content. The data is for assigning rights to the content. One embodiment includes ascertaining whether at least a portion of the digital content matches known digital content and associating data that attaches rights to the at least a portion of the digital content in a secure manner. One embodiment includes associating the data in a secure manner. One embodiment further includes determining a fingerprint of original work and storing the fingerprint in a database of fingerprinted works that is searchable. An unknown work is matched to a known work by fingerprint, and rights information is associated with the original work in a secure manner.

While the description herein is in terms of multimedia content, embodiments of the invention are also applicable to other forms of content, e.g., game software.

Use of an embodiment of the invention allows identification of multimedia content or other digital content whose rights are owned. One embodiment includes the ability to match multimedia content regardless of distortion, re-coding and editing of an original work.

In one embodiment, once a work is identified, policies can be applied to the identified multimedia content.

One embodiment is in the form of a computer-readable carrier medium that carries instructions that when executed by one or more processors of a processing system cause the one or more processors to carry out a method of identifying multimedia content Terminology This disclosure uses the following terminology:

Digital content. This includes audio, video, game software or other similar digital content. While in some embodiments, the multimedia content is assumed to be digital, some embodiments do not require the digital content to originally be digital. At some stage, content that is not in digital form is digitized. Most the of the description is in terms of digital content that is multimedia content, so the term multimedia content is used herein without loss of generality.

Original work. Multimedia content that is original, e.g., not derived from any other work.

Referenced work. Multimedia content that one or more other works are referenced to, e.g., a multimedia work to which rights may be asserted. In some cases, a referenced work includes a variation of one or more original works or a combination of one or more original works. That is, a referenced work may be derived from one or more original works.

Unknown work. Multimedia content prior to any identification. Such work may have associated metadata.

Examined work. Something which someone wishes to identify, e.g., an unknown work in the process of, or after identifying. Such examined work may have metadata associated therewith.

Fingerprint. Data that is usable to identify multimedia content. Generally, a fingerprint of multimedia content is smaller, e.g., much smaller than the multimedia content. In one embodiment, a fingerprint of an item of multimedia content is designed to uniquely identify the item of multimedia content in almost all practical situations. In one embodiment, the fingerprint of multimedia content is a cryptographic hash function, also called a secure hash function of the multimedia content. In one embodiment, it is the MD5 hash function, in another embodiment, the SHA-1 hash function. In yet another embodiment, the fingerprint is based on perceptual qualities, e.g., a function of audio properties in the case of content that includes audio. Another version uses a function of video properties in the case of multimedia content that includes video. Different implementations of the present invention use different fingerprinting functions.

Associable reference. A function of a multimedia content that is usable to efficiently and unambiguously identify the work. While an associable reference might be the fingerprint of the content, in one embodiment, it is a function used to match content more efficiently and unambiguously than a fingerprint. In one embodiment, the associable reference of multimedia content is a cryptographic hash function of the multimedia content. In one embodiment, it is the MD5 hash function, in another embodiment, the SHA-1 hash function.

Policy. Rule for what may be done with an examined work based on which referenced works provided source material. A policy may be very simple, such as, "no restrictions" or arbitrarily complex.

Multimedia content originator. The creator of a referenced work or an examined work.

One embodiment of the invention includes the following processes:

Cataloging referenced works to generate a catalog.

Matching examined works to referenced works, including matching examined works to referenced works through the catalog and ascertaining of there was a previous association.

Associating examined works to referenced works to form associated works that include a set of associations for the examined work to associate such examined work with one or more referenced work.

Different embodiments optionally include one or more of the following:

Storing referencable associations for searching for matches through association.

Matching examined works for association.

Assigning policies to referenced works.

Associating policies to examined works.

Providing for originator-based association.

Providing for pre-matching.

Providing for third party matching.

Each of these is discussed in more detail herein under.

Cataloging Referenced Works

FIG. 1 shows the data flow of one embodiment of the invention. A multimedia content originator 110 creates a referenced work 120. The method includes in 130 assigning policies to the referenced work, the assigning typically being by the content originator 110. That is, the multimedia content originator 110 creates rules corresponding to a referenced work that are stored as policies 101, e.g., in a policies database for referenced works. One embodiment of the method further includes cataloging 140 referenced works prior assignment or management of rights, including storing information in a catalog 102. The cataloging process 140 includes including determining identifying information, such as a fingerprint, from the referenced work 120. One embodiment includes the multimedia content originator 110 also creating metadata related to the referenced work 120 to be included in the catalog 102. The cataloging process 140 includes organizing the identifying information (fingerprints) and the metadata for the referenced works and for storage in a fingerprint and metadata catalog 102 which in one embodiment is a database. Thus, fingerprints of referenced works are stored and made available in a manner such that the fingerprint data is available for searching to determine whether or not there is a match to one or more referenced works.

In an alternate embodiment, the assigning of rights is by a third party. Such a third party may act as a proxy for the originator. In one embodiment, the third party may be an entity assigning rights to works that are in the public domain.

In one embodiment, each referenced work is indexed so that an index can be used to refer to each referenced work in the catalog 102.

While one embodiment includes a single database for the catalog 102, in another embodiment, the information in the catalog 102 is distributed.

The size of multimedia content fingerprinted for cataloging, called the granularity of the cataloging is in one embodiment consistent with the sizes of elements of the referenced work that need to be matched. For example, if a rights owner wishes to identify portions as small as 5 seconds, a fingerprinting method is used that can catalog 5 second portions for later matching.

Assigning Policies to Referenced Works

As described above, policies may be established, e.g., by the owner of a referenced work regarding the use of the referenced work. Many different types of policies are known for such content as theatrical movies, CDs, DVDs and other common forms of media, including free distribution of multimedia content without constraint.

Examples of policies include:
A charge rate per second and/or per play of a referenced work.
Variable usage policy, e.g., usage fee based on what portion of a referenced work is included. Using movies as an example, different portions of a movie may have different values because, for example, of that portion's "cultural relevance" or other measured of importance. As an example, the portion in "Sudden Impact" in which Clint Eastwood playing Harry Callahan says "Go ahead, make my day" may have a higher rate or different usage constraints than other portions of the referenced work, in this case "Sudden Impact".
A restriction such as a rule that any work that includes a referenced work may not be re-distributed if such referenced work is combined with any referenced work of another rights holder, or with any referenced work with a specified other rights holder, or with one or more specified referenced works.
One or more retention policy such as a rule or rules as to how long a policy lasts, or how long the work is to be made available.

Recall that the process of assigning policies to referenced works creates a data store of policies 101 that includes policy information along with ownership information for each referenced work.

In one embodiment, one or more polices in the store of policies 101 are pre-defined, while other policies are rule-based, e.g., defined by some processing method.

While in one embodiment, the policy and ownership data is stored separately in a policies store 101, in an alternate embodiment, the catalog 102 includes ownership and policy information for the referenced work, as well as the fingerprint of the referenced work.

Receiving an Unknown Work and Submitting as an Examined Work

Figure 2:
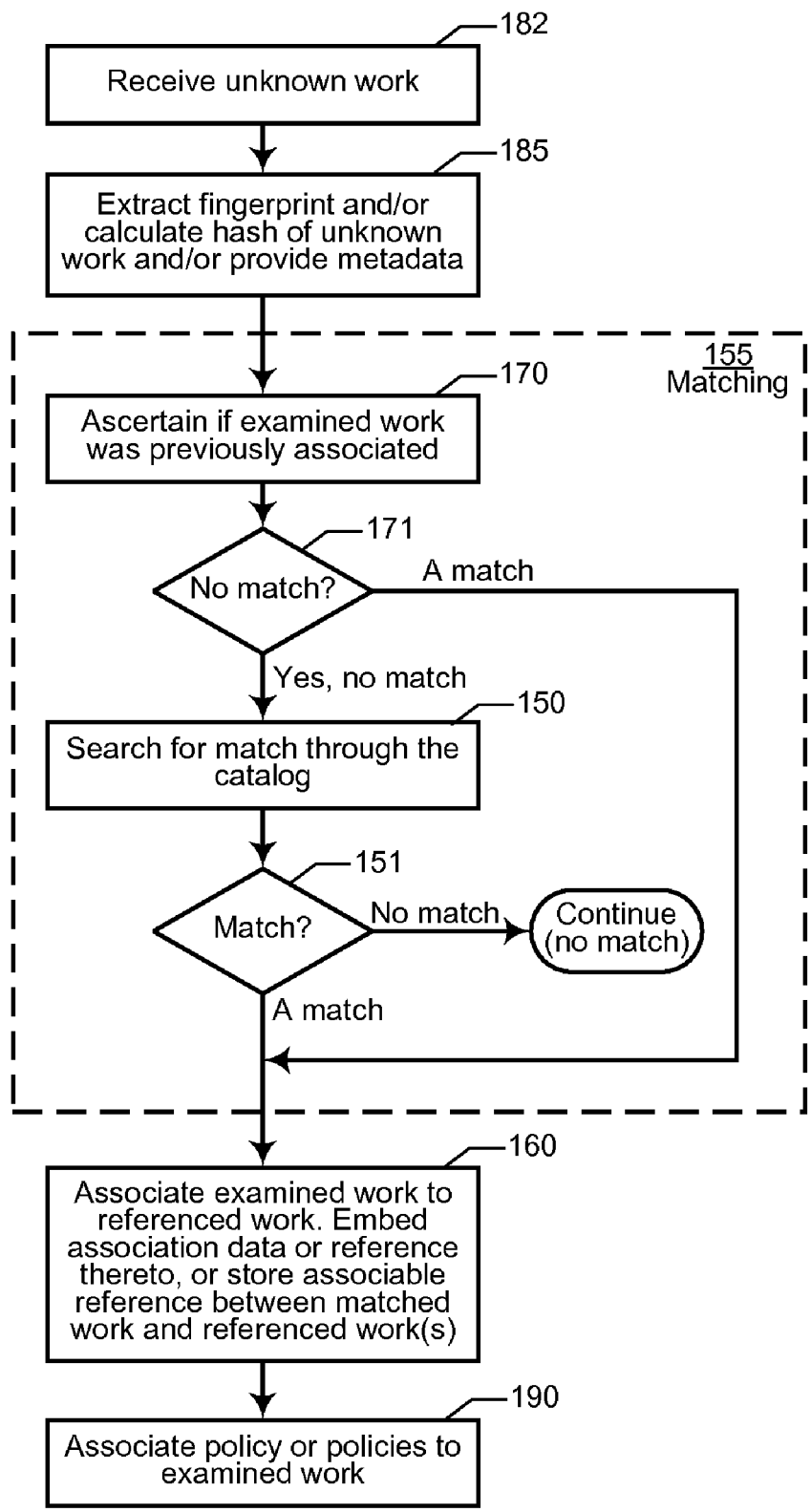
FIG. 2 shows a simplified flowchart of an example method processing an unknown work by an embodiment of the system.

FIG. 2 shows a simplified flowchart of an example method of processing an unknown work by an embodiment of the system. The following description makes reference to both the dataflow diagram of FIG. 1 and the flowchart of FIG. 2.

Through some receiving mechanism, in 182, the system receives an unknown work 180. One receiving process 182 is a user uploading multimedia content 180 to the system.

For further processing as an examined work, one embodiment includes a process 185 that includes one or more of extracting a fingerprint from the unknown work 180 for searching the catalog of fingerprints, and/or providing metadata for the unknown work 180. The fingerprint extracted by the process 185 is one of the fingerprints used in the catalog 102. The process 185 might in some embodiments include determining an associable reference, e.g., a secure hash of the work.

Matching Examined Works to Referenced Works

In 155, a search for a match is carried out to ascertain whether there is a match to one or more referenced works. The results of a positive match is an association of the examined work to one or more referenced works to form an associated work. A record is maintained of the association. The record is in the form of association data. In one embodiment, the association data is embedded with the examined work to form the associated work. In one version, the association data itself is embedded with the examined work, while in another, a reference to the association data is attached to the examined work to form the associated work. In another embodiment, the association data is maintained separate from the examined work and a record is kept of previous associations, e.g., a record is maintained of a secure hash of the examined work together with an indication of the one or more referenced works included in the examined work via the association. In one embodiment, the separately maintained record of previous associations, e.g., previous positive search results is in the form of a store 103 of referencable associations between examined works and matched referenced works that includes associable references, e.g., secure hashes of previously matched works, together with references to the one or more referenced works they were matched to. In one embodiment the store 103 includes for each such associable reference, the one or more indices of the referenced works matched to the referenced association of the examined work.

Thus, in one embodiment, search 155 includes one or both of a search of the catalog 102 of fingerprint data and an ascertaining 170 of whether the examined work was previously associated, e.g., by obtaining the association data or the reference thereto from the work itself for embodiments in which the association data or reference thereto is attached to the examined work, or by searching the store 103 of referencable associations.

In one embodiment, as shown in the flowchart of FIG. 1, process 155 includes 170, 171, 150, and 151. In 170, a search for a match of the examined work is carried out through association, e.g., by extracting from the referenced work the association data or reference thereto, or by searching the store 103 of referencable associations. If no match is found (see 171), in 150, a search for a match of the examined work is carried out by searching the catalog 102. If no match is found either via the catalog or via ascertaining if there was a previous association, e.g., by a search in the store 103 of referencable associations, the matching process ends with no match, e.g., no further data is associated with the examined work, resulting, for example, in no restriction placed on the content. If a match is found (see 151), the process continues with associating data with the examined work as described herein.

Matching Examined Works to Referenced Works Through the Catalog

The search process 150 uses the fingerprint of the examined work by searching information in the catalog 102 of fingerprint and metadata of referenced works to ascertain whether there is a match of the examined work to at least one referenced work. By "matching" a work through the catalog is meant the process of searching to ascertain if there is a match in the examined work in the catalog.

One embodiment allows for an examined work to be derived from one or more referenced work by including all or some of a referenced work. In one embodiment, any included referenced work may be in an original form, or it might be modified in some manner. One embodiment includes producing a match for referenced work that has been modified by at least one of:

Editing. The examined work may include an edited version of a referenced work in which one or more portions are omitted or reordered.

Distorting. The examined work may include an altered version of a referenced work altered in a manner that changes the content, but that still is recognizably derived from the original work. In the case of audio, for example, the audio may be reduced in fidelity or have altered speed. In the case of video, the video may be blurred, its frame rate changed and/or its color altered. One example of an examined work that is an altered version of a referenced work is the video resulting from using a video camera to record a screening of a movie (the referenced work) in a movie theater.

Re-coding. Media may be re-coded from data encoded according to one encoding method to data encoded according to another encoding method. For example, an MPEG-2 video to may be re-coded to an MPEG-4, Part 10 video (ITU-T Recommendation H.264). Also, media may be converted between digital and analog.

Mixing with other media. Media from one work, e.g., the video from a first audio-visual work might be mixed with the audio of a second audio-visual work.

Compositing. Media might be modified by the addition or deletion of elements. For example, a video containing one person might have another person's face superimposed. In another example, two videos might be mixed. In another example, audio might be superimposed with one or more of commentary, music or singing.

Step 150 is implemented according to the particular fingerprinting method used for identifying content and stored for referenced works in the catalog 102. Different fingerprint calculating and corresponding searching methods are known in the art. Different embodiments use one or more such fingerprint calculating and corresponding searching methods.

In one embodiment, the fingerprinting includes determining a fingerprint that is a fixed-length cryptographic hash function, also called a secure hash function, e.g., a MD5 or SHA-1 hash function of the digital data of the content. Many methods of searching for a match with a fixed-length cryptographic hash functions are known.

In another embodiment, the fingerprinting includes determining a fingerprint of one or more human-perceptible features, e.g., fingerprinting and searching for a match of audio data is used, or fingerprinting and searching for a match of video data is used.

Fingerprinting and searching for a match of audio data is known in the art. See, for example, methods provided by Gracenote, Inc. of Emeryville, Calif. (See www.gracenote.com), Shazam Entertainment Ltd., London, U.K. (See www.shazam.com), and Audible Magic Corporation of Los Gatos, Calif. (See www.audiblemagic.com). See also U.S. Patent Application Publications US 2003086341 titled AUTOMATIC IDENTIFICATION OF SOUND RECORDINGS and US 2003028796 titled MULTIPLE STEP IDENTIFICATION OF RECORDINGS. One embodiment uses the method described in US 2003086341.

In one embodiment the fingerprinting includes determining a fingerprint of audio data of video and the searching uses the determined audio fingerprint for a match.

In one embodiment the fingerprinting includes determining a fingerprint of video data. Many techniques are known for fingerprinting video information and for searching a database of fingerprints of video. See for example, "Video Fingerprinting," by Philips Content Identification, Eindhoven, and International Patent Publication No. WO 20051041455 titled VIDEO CONTENT DETECTION. See also U.S. Patent Application Publication US 20061013732 titled SYSTEM, METHOD & COMPUTER PROGRAM PRODUCT FOR VIDEO FINGERPRINTING. The process in 150 can use any of these video matching methods to match video information. One embodiment, for example, uses the method described in US 20061013732.

Alternate embodiments use other mechanisms, and those in the art will understand that many suitable fingerprinting and search methods are known and can be used in different embodiments of the invention.

Matching might indicate what modifications, such as those listed above, have been applied. The searching 150 may associate whole or partial elements of the examined work to one or more referenced works.

If the examined work includes a concatenation or other combination derived from more than one referenced works, each portion and each element of media, e.g., of audio and of video if a match to each type of media is found, is matched to the corresponding referenced work.

If no match is found in either process 150 or process 170, the work is an original work and should not be associated with any referenced work.

The Matching Data and Associating.

Different embodiments use different matching methods in 150 of different levels of sophistication, and such methods produce different amounts of data about a match. Some matching methods, for example, provide a confidence level. Other methods include identification of any modification that was made to the referenced work as included in the examined work.

In 160 data about the matches, called the association data herein, is associated with the examined work to form associated work. Associated work includes the examined work and any associations it carries to referenced work.

In an alternate embodiment, the process 170 of ascertaining of there was a prior association is not included in the initial processing of submitted work, so that every submitted work that becomes an examined work is searched (150) only through the catalog 102. Of course, once association is made, later use of the multimedia content, now in the form of an associated work, might involve lookup of the association Associating Examined Works to Referenced Works to Form Associated Works Once the examined work has been matched to one or more referenced works, in one embodiment, the method includes collecting the matching data and associating the matching data with the examined work to form an associated work. The matching data is called association data herein, and the process of combining the association data with the examined work to form associated work is called "associating" herein.

One embodiment includes storing the associated work in a store 104 of associated works.

In the one embodiment, data is collected in a table containing the one or more referenced works of the match and the matching data between the examined work and the referenced works. Depending on the sophistication of matching, the associated data and the associating of 160, e.g., the table of associations could include which portions of the examined work match with which portions of the referenced work along with an indication of modification(s) made to the referenced work(s).

In one embodiment, the associating 160 includes attaching the association data for an examined work with the multimedia content of the examined work so that the associated work includes a combination of multimedia content and association data.

Different attaching methods are used in different embodiments of attaching the association data. One embodiment appends the association data to the multimedia content. Another embodiment pre-pends the association data to the multimedia content. Yet another embodiment includes inserting the association data into the examined work.

Yet another embodiment of attaching the association data includes in 160 overlaying the association data with the multimedia content of the examined work using methods such as used in digital watermarking. Digital watermarking is a known technique for adding data to multimedia content. Many specific methods are known for digital watermarking. In one embodiment, an "invisible" watermarking method is used in a manner such that the added data is not perceivable or almost imperceptible when playing back the watermarked multimedia content.

Yet another embodiment of attaching the association data includes in 160 linking association data with the examined data such that when the examined work is stored or transmitted, the association data is stored or transmitted therewith.

Yet another method includes in 160, instead of attaching the actual association data with the examined work, e.g., by appending, pre-pending, inserting, or overlaying by digital watermarking, attaching a reference to the association data with the examined work. In different embodiments, the reference to the association data is appended, pre-pended, inserted, or overlaid by digital watermarking. The actual association data is stored elsewhere, e.g., in the store of referencable associations 103.

Because digital watermarking methods work best with small amounts of data being overlaid, the inventors have found digital watermarking to be a particularly suitable method for the case of the associating 160 including attaching a reference to the association data.

In one embodiment of attaching a reference to the association data, the reference to the association data includes an indication of the location of the association data. In one example embodiment, the attached reference to the association data includes a URL for a matching authority and a reference to the specific examined work. In one embodiment, the reference to the specific examined work is an associable reference of the examined work, e.g., a secure hash of the examined work. The associating 160 includes storing the associable reference, e.g., secure hash of the examined work along with the association data describing the association to the one or more referenced work in the store of referencable associations 103. The matching authority is responsible for the matching 150 and the maintaining of the store of referencable associations 103. In one embodiment, the store of referencable associations 103 includes for each stored signature of an examined work the one or more indices to the referenced work for easy retrieval of data in the catalog 102 and/or in the policies store 101

In yet another embodiment, the association data is stored separately and no association data or reference thereto is stored with the examined work. One example includes storing the association data in the store 103 of referencable associations. In one such embodiment, lookup of the association data would be through an associable reference of the examined work, e.g., a secure hash of the examined work determined at the time of lookup from the examined work.

In different embodiments of the invention, the associating of 160 is carried out in a secure manner such that the associated work is secure, e.g., from tampering. In one embodiment, the association data is digitally signed by a trusted authority and the resulting trusted signature is included.

In one embodiment, the matching 155 and the associating 160 is carried out by an authority, that is, by an entity who has implicit trust. Such an entity, called the matching authority herein, signs the results of the associating to ensure authenticity of the process and/or the association data, resulting in a trusted signature.

Matching Examined Works for Association

Once an examined work is associated to form an associated work, there are various reasons to search an examined work to see if it corresponds to an associated work. This could be for royalty arrangements, avoidance of copyright infringement, anti-piracy, marketing or other purposes. Regardless of the reason for matching, such a process includes ascertaining if the examined work was previously associated and if so, obtaining the association data.

Association data is obtained by applying the appropriate method depending on which means was used for association. That is, if the data was attached, it would be examined in place. If the data required a lookup at a separate site, the lookup would occur. And, so forth.

Associating Policies to Examined Works

Once the association data is obtained from a previously associated work or generated in process 160, the associated work can also have one or more policies associated with it. Such a process of adding one or more policies is called associating 190 one or more policies to examined works. The adding also is carried out in a secure manner. For example, the policy data is part of the association data that is signed to form a trusted signature.

In one embodiment, the policies associated with the examined work are implicitly defined by the association data. In another embodiment, the policies associated with the examined work are added to the association data.

In one embodiment in which the policy data is stored in the catalog 102 together with the fingerprint data and metadata, the policies associated with the examined work are retrieved from the database 102 along with the other metadata regarding the referenced work.

In another embodiment in which the policy data is stored separately in policies store 102, the policies associated with the examined work are retrieved from the database 101.

The associating 190 of one or more policies to examined works includes the various associating mechanisms described above for the association data. The result of associating the one or more policies to the examined work results in associated works with policies 105.

In one embodiment, the policy data for the referenced works in an examined work is included with the association data.

In another embodiment, the policy data for the referenced works in an examined work is separate from the association data.

One method 190 of associating the policy data includes attaching the policy data for an examined work with the multimedia content of the examined work so that the associated work includes a combination of multimedia content, policy data, and association data. As in the case of association data, different attaching methods are used in different embodiments of attaching the policy data. One embodiment appends the association data to the multimedia content. Another embodiment pre-pends the association data to the multimedia content. Yet another embodiment includes inserting the data into the examined work. Yet another embodiment includes a reference to the policy data. The reference to the association data is appended, pre-pended, inserted, or overlaid by digital watermarking.

In different embodiments of the invention, the associating of 190 is carried out in a secure manner such that the associated work is secure, e.g., from tampering. In one embodiment, the policy data associated with the associated work is digitally signed by a trusted authority to produce a trusted signature.

In one embodiment, the matching 155, the associating 160 and the policy associating are carried out by the matching authority.

More than one policy may exist for a given examined work. One embodiment includes, in the associating of the one or more policies 190, providing a method of arbitrating multiple policies.

Originator-Based Association

While one embodiment described above would typically be operated by a service, e.g., that ran a matching authority, one embodiment of the invention includes a method of associating association data with multimedia content that is operated by a multimedia content originator. Such an originator creates an original work that becomes examined work for the system. Such an originator would generally know what multimedia content they are using, e.g., referenced works included in the examined work. The originator thus can make the associations between the original work and one or more referenced works included in the original work.

One embodiment of the invention includes an authority issuing certificates with different levels of trust to other entities. Some entities might have a level of trust such that any associations made by the entity acting as a content originator is trusted.

For example, in one embodiment, a "movie studio" certificate is issued to content originators that are movie studios. Such a movie studio, for example, might create a trailer of a movie, and can associate the trailer to the movie.

Delivering Pre-Matched Content

Once multimedia content has been matched and association data associated as a result of the matching, such multimedia data can be delivered to some party, e.g., a service that accepts multimedia content—a user-generated multimedia content site. One version of such a service can restrict accepting only associated works, i.e., content that has been matched for the user-generated multimedia content site.

One implementation of an embodiment of the invention can be operated by the a matching service to which a content originator submits an original work for matching and associating. In one embodiment, the matching service is the same as the ownership service described herein. The matching service matches and associates in a secure manner, thus creating association data. The resulting associated work is then ready for submission to, for example, a user-generated multimedia content site that only accepts multimedia content after it has been associated and otherwise meets the site's one or more criteria for acceptance.

Example of Use of an Embodiment of the Invention

One embodiment is a system used to manage rights related to multimedia content on a user-generated multimedia content site, e.g., a video sharing site such as YouTube.com (see www.youtube.com). In the following description, the content is assumed to include video and audio elements, and is thus referred to as a video and as a movie. Those in the art will understand that multimedia content is not restricted to such information and can include still images, audio only, video only, a combination of any of these, and in the future, other sensory material, e.g., a time-track of smells or touches.

Figure 3:
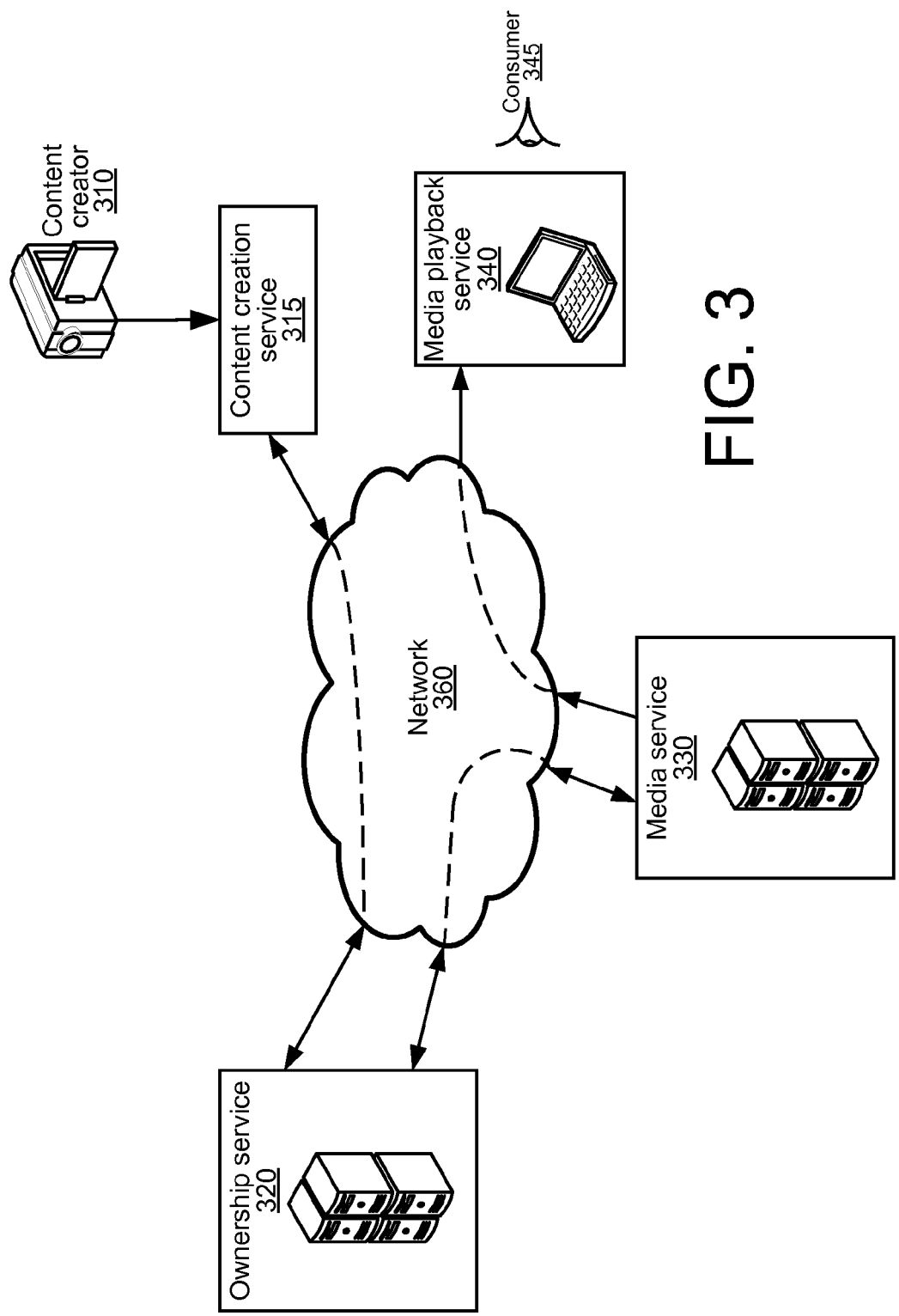
FIG. 3 shows elements of one embodiment of the invention.

FIG. 3 shows elements of one system embodiment of the invention. A multimedia content creator 310, e.g., a human user using a video camera creates multimedia content 180, e.g., video using a content creation service 315, e.g., a computer system coupled to one or more sources of video. In one embodiment, the content is created in digital form. In another embodiment, some of the content is provided in non-digital form and is converted into digital form, e.g., by processing in the content creation service 315.

In one embodiment, the content creation service 315 is coupled via a network 360 to an ownership service 320 that operates some of the processes of an embodiment of the invention. The network 360 may be a network of networks, including publicly accessible networks such as the Internet.

One embodiment of the ownership service 320 operates at least some of the processes and maintains at least some of the data stores described in the dataflow diagram of FIG. 1 and steps of the flowchart of FIG. 2. As an example, in one system the ownership service 320 operates cataloging 140 and the assigning of policies 130, and maintains the resulting stores 102 and 101. The ownership service further operates the matching 150, ascertaining if the content is an associated work 170, the associating 160 and the adding policies of 190, and maintains the related stores 103, 104 and 105. One embodiment of the ownership service 320 operates on a processing system that includes at least one processor. The processors and/or storage components of the processing system may be located at one place, or distributed and coupled by some network.

In one embodiment, a level of trust is associated with some users. In one embodiment, the ownership service operates additional services including a method that issues certificates with different levels of trust to entities. In some embodiments of the invention, an entity with a sufficient level of trust may carry out the associating of step 160 and the adding of policies 190, and add its signature to such association data. Any associations made by an entity with a sufficient level of trust when acting as a content originator is trusted. For example, in one embodiment, a certificate having a "movie studio" level of trust certificate is issued to content originators that are movie studios. Such a movie studio, for example, might create a trailer of a movie, and can associate the trailer to the movie.

While any user may assert ownership, whether or not the ownership is accepted by the system depends on the level of trust of the entity asserting ownership, e.g., on the level of trust of a certificate submitted by the entity.

In general, an unknown user submits multimedia content to the ownership service as an unknown work. Any rights to such initially unknown work are verified by the ownership service 320 using an embodiment of the present invention, including the ownership service 320 accepting an unknown work. Process 185 extracts a fingerprint related to how data is stored in the catalog 102 and/or calculates an associable reference related to what is stored in the store of referencable associations, e.g., calculates a secure hash of the unknown work and/or accepts any metadata and policies desired by the submitter.

The ownership service 320 ascertains whether there is association data for the submitted work, or searches for a match to referenced work in the catalog. The result is an associated work with policies added. In one embodiment, such an associated work is returned to the submitter. In those embodiments in which the association data is appended or pre-pended, only the association data needs to be returned to the submitter (the content creation service), with the understanding that the work is now an associated work and is to be used with the association data. For example, if the association involves appending a "footer" containing association data, the ownership service 320 returns only the footer for appending to the content for future use.

Such future use might be playback, e.g., by a media playback service 340 coupled to the network 360 that the ownership service also is coupled to.

Data Structures for Associated Data

Figure 4:
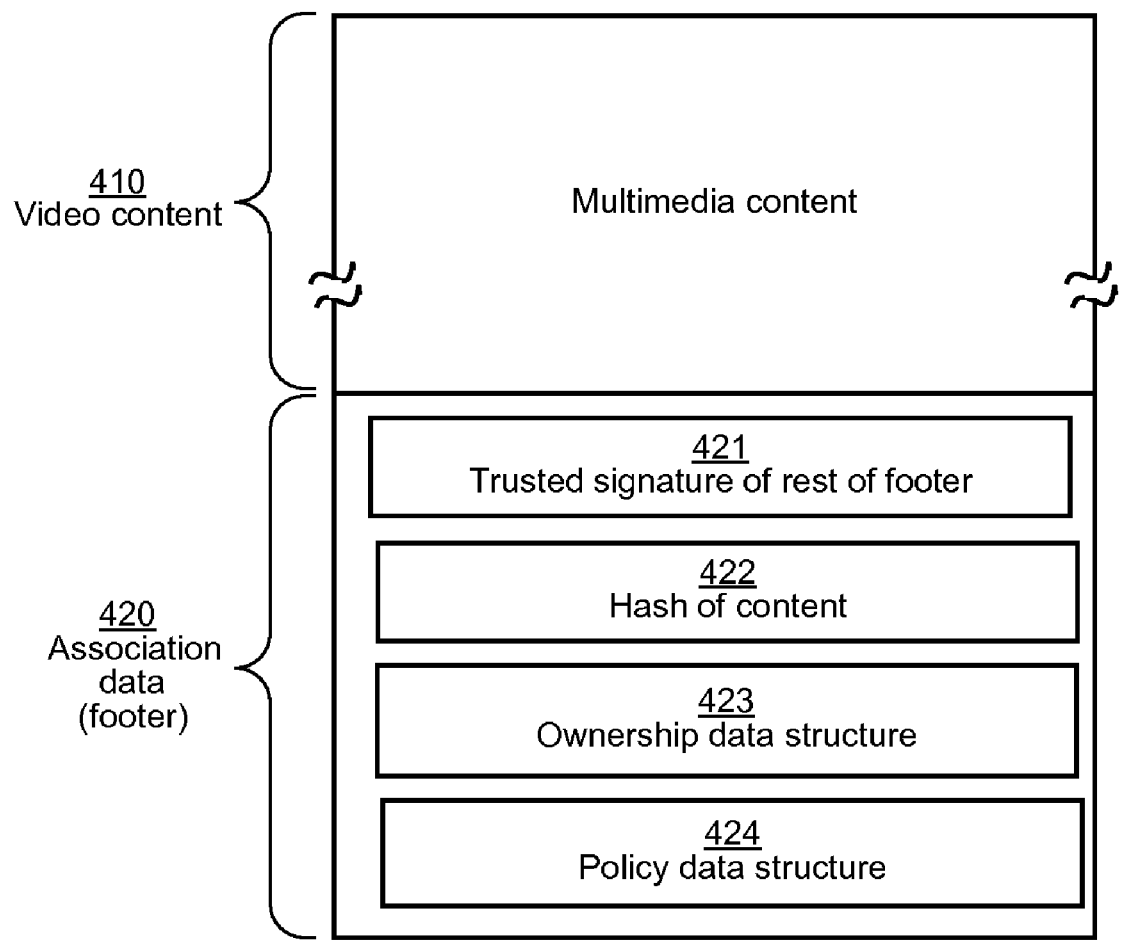
FIG. 4 shows a representation of an example associated work with policies, i.e., a multimedia content after association.

FIG. 4 shows one embodiment of an associated work 400 with policies, i.e., multimedia work after association and, in the example shown, after policies have been added according to an embodiment of the invention. In the example, the associated work includes the multimedia content 410 and the association data 420 that in the example shown is appended as a "footer" to the multimedia content data 410. The footer is signed by the ownership service 320 with trusted signature 421 of the association data itself. This signature 421 is usable by other parties to verify the validity of the ownership and of the rights data, ie., to check the validity of the association data.

While many different data structures may be used for the association data, in one embodiment, the data structure is a relationship database that includes a set of tables. In one embodiment, the data structure for the association data includes a digest, e.g., a secure hash such as a SHA-1 or MD5 hash of the content. The hash of the content is shown as data 422 in the association data. Use of such a digest 422 is known to those in the art and ensures that the content 410 submitted with the footer 420 has not been substituted or otherwise tampered with.

The association data includes a data structure 423 that asserts the ownership of the content, and another data structure 424 that includes policy information.

The association data thus appended, or in alternate embodiments otherwise associated with the multimedia content, is designed to be sufficient to implement the policies at a media service 330 that is also coupled to the network 360 and that, for example, provides services via the network to a media playback service 340 for playing back the content while ensuring that rights are honored by communicating with the ownership service 320.

Thus, the association data includes a data structure 423 for the ownership data for a work. In one embodiment, such ownership data structure 423 is in the form of an ownership table as shown below as Table 1 with a heading row and two (empty) records.

TABLE 1

| an ownership table | | | | |
|---|---|---|---|---|
| Time start | Time end | Priority | Ownership | Data |

In each record of the ownership table shown as Table 1:
Time start and time end respectively define the start and end of the portion of content that has ownership in the form of offsets from the beginning of the multimedia content.

Priority defines which priority ownerships apply. One embodiment provides for having different priority levels for ownership such that a higher priority level preempts a lower priority ownership when there is more than one claim of ownership. Equal priorities both assert ownership.

Ownership provides an identification of an owner.

Data defines any additional information, such as how ownership rights are handled given multiple owners.

There may be multiple records for each time segment.

The policy data structure 424 is provided in one embodiment as a set of rules that define the conditions of use for the content. The policy data structure may provide other data.

In one embodiment, the rules of the policy data structure 424 are organized as a table. The following Table 2 shows one embodiment of such a table called a "policy table."

TABLE 2

| A policy table | | | | |
|---|---|---|---|---|
| Time start | Time end | Rule priority | Action | Data |

In this policy table:

Time start and time end respectively define the start and end of the portion of content that the rule applies to in the form of offsets from the beginning of the multimedia content.

Rule priority defines which rule takes precedence if more than one rule applies to the same period. One embodiment provides for having different priority levels for rules. Higher priority rules take precedence. Equal priority rules are all applied.

Action defines what is done with the multimedia content. One embodiment includes the following possible actions. The system is designed so that in the future additional actions may be defined.

Play.

Don't Play.

Pay Royalty.

Share advertising royalties.

Provide specific advertising.

Restrict play to that of multimedia content from same owner or restrict mixing of content different owners, e.g., the action might specify that content cannot includes a mix of Disney content and Paramount content, or that such Disney content and Paramount content may not be played together.

Data contains information regarding the rule such as a reference to terms of an agreement about what advertising will be shown or how much royalty will be paid.

The following Table 3 is an example of a policy table that includes information stored to allow an entire movie to be played for free except for one two-minute period that requires a royalty payment.

TABLE 3

| A policy table | | | | |
|---|---|---|---|---|
| Time start | Time end | Rule priority | Action | Data |
| 00:32:01 | 00:34:01 | 0 | Pay Royalty | $0.001/second |
| 00:00:00 | 02:12:33 | 1 | Play | |

In one embodiment, the ownership service 320 uses the policy data structure 242, e.g., the policy table to determine which rules are applicable to a particular segment of content. When there is more than one owner for a particular segment, the ownership service 320 resolves any conflicting rules for the particular segment.

Figure 5:
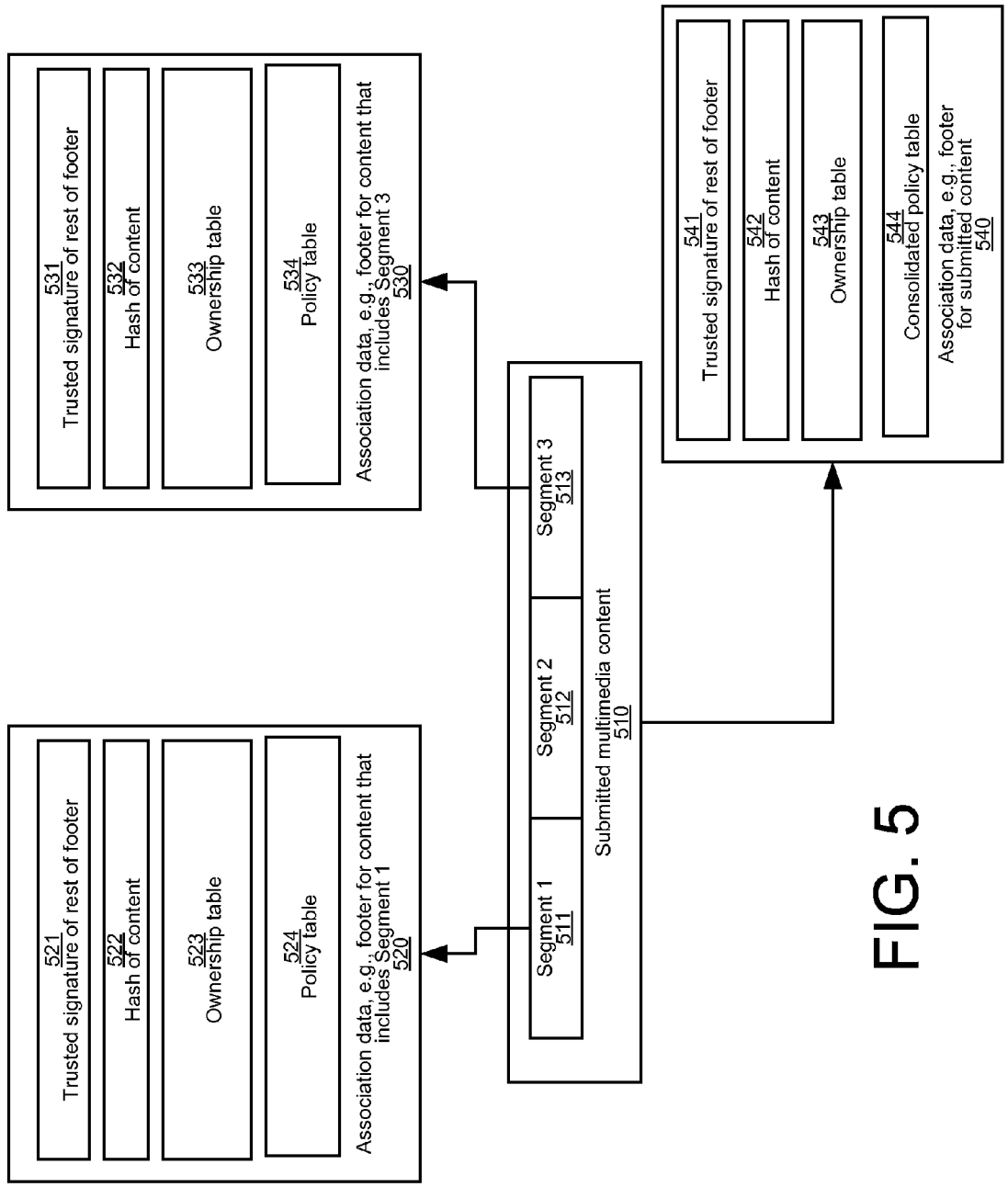
FIG. 5 shows an example of a submitted multimedia content that includes a plurality of segments.

FIG. 5 shows an example of a submitted video and is used for illustrating resolving multiple rules. An example submitted video 510 includes three segments: Segment 1 511, Segment 2 512 and Segment 3 513. Suppose each of the segments is from a respective content that has been analyzed, and that the content containing Segment 1 and the content containing Segment 3 are associated works. The corresponding association data is shown as association data, e.g., footer 520 and association data, e.g., footer 530 that described rights associated with Segments 1 511 and Segment 3 513. Footers 520 and 530 respectively include trusted signatures 521 and 531, trusted content hashes 522 and 532, ownership data structures in the form of ownership tables 523 and 533, and policy data structures in the form of ownership tables 524 and 534, respectively. The rights are described in the policy tables 524 and 534.

In one embodiment of resolving policies, the ownership service first determines what segments each rule in the policy tables 524 and 534 applies to. For example, if Segment 1 does not fall within the time start and time end of a rule in policy table 524, the rule does not apply. For each segment, any rule that is outranked by any higher priority rule is deemed not to apply. For example, if there is a highest priority rule in policy table 534 covering Segment 3, lower priority rules do not apply.

The ownership service 320 calculates a hash 542 of the submitted multimedia content, and also determines an ownership table for the submitted content for inclusion in association data 540 for the submitted data. The ownership service 320 also determines a consolidated policy table that includes all rules after resolution, i.e., all consolidated rules. The hash 542, ownership table 543 and consolidated policy table 544 are signed by the ownership service 320 to form a trusted signature 541. The resulting association data is associated to, e.g., appended to the submitted content 510 as a footer 540.

In one embodiment, there may be specific agreement between media owners and the ownership service about rule resolution. The expected default behavior is to honor the most restrictive right. For example, if a submitted work includes segments of a first and a second owner, and the first owner's rule states it is acceptable to play, but the second owner's rule is more restrictive, i.e., states no play is possible, the consolidated rule would be to not play.

In one embodiment, if financial terms are included, the financial terms included in the consolidated policy table 544 include the accumulation of terms. That is, all owners would be paid in accordance with their rules. Furthermore, advertising for each owner would be provided as specified by the rules.

In one embodiment, as a result of submission, the ownership service 320 stores fingerprint, metadata and policies in the catalog 102 and policy store 101 and makes this information available for retrieval. Thus media files of the original multimedia content processed and a fingerprint file is created containing the information necessary to search for matches with any referenced work(s). Metadata is organized in a form for easy retrieval. In one embodiment, the data for the submitted work is stored in a database—the catalog store 102. The database is organized so the data could be retrieved based on a unique identifier for the multimedia content. All data related to the movie is tied together in the database using the unique identifier. While a database is used in one embodiments, other embodiment use other data structures for storing the submitted initially unknown work.

Submitting Works to a Video Service

Figure 6:
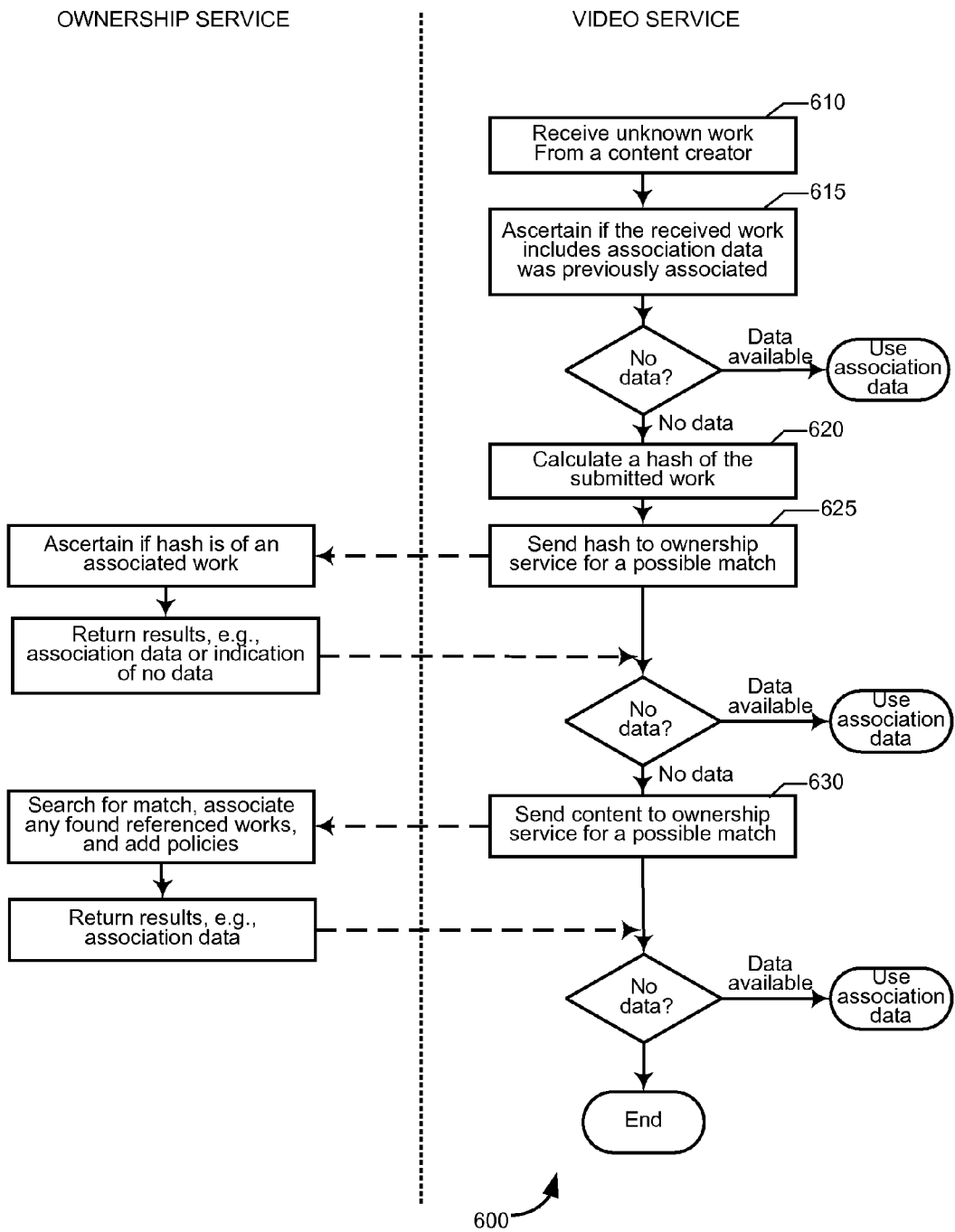
FIG. 6 shows a flowchart of one method embodiment operating as part of a video service.

FIG. 6 shows a flowchart of one method embodiment 600 operating as part of a video service 330, e.g., a service such as a Website for user-generated and other multimedia content that accepts submissions from content creators. The method 600 is implemented in a processing system that includes one or more processors and that is coupled to the network 360 to which the ownership service 320 also is coupled. FIG. 6 includes elements that are carried out by the ownership service.

In one example, a user generates multimedia content using a user video creation system 315 and submits it to the video service 330 along with metadata. The video service 330 in 610 receives the submitted content.

In one embodiment, the video service 330 ascertains in 615 if the submitted work is an associated work, e.g., will look for associated ownership and rights data. For example, in the case that association data is included as a footer as shown in the example of FIG. 4, the video service examines the video to see if it contains ownership information such as shown in FIG. 4.

If ownership information is not attached, in 620, the video service generates an associable reference, e.g., a secure hash of the content and in 625 submits (sends) the hash to the ownership service 320. The ownership service 320 can look in a database of referencable associations (103) to determine (170) if this content has already been associated. If it is ascertained that the content has been already associated, the ownership service 320 returns the association data, e.g., footer 420 to the video service 330. If the results are negative, the ownership service responds with a negative result.

If both the video service 330 and the ownership service 320 ascertain that none of the submitted content has previously been associated so that ownership or rights data is not available for the submission, in 630, the video service 330 submits (sends) the fingerprint of the submitted multimedia content, or in an alternate embodiment, the submitted multimedia content to the ownership service 320 as an examined work. The ownership service performs the matching 150 and association 160, 190 for that multimedia content and returns the association information to the video service 330. In one embodiment, the returned information is the form of the footer 420 shown in FIG. 4.

Note that the fingerprint is not necessarily a single entity. A portion of the fingerprint can correspond to a portion of the content. Therefore, in 630, in one embodiment, the video service 330 submit portions of the fingerprint until a sufficient match and association can be made.

One embodiment also allows for the multimedia content creator to include ownership and possibly policies with the video submission to the video service 330. In one such embodiment, such ownership and policy information is passed to the ownership service 320. If the ownership service does not find a match, this information could be used for ownership.

The inventors recognize that the ownership service includes using controls to avoid ownership service 320 from asserting rights to multimedia it does do not own.

Playing a Video

In one embodiment, the video service 330 maintains a database of video multimedia content and association data for such content, including policies associated with that multimedia content. In one embodiment, the video service 330 provides a user interface that allows a video consumer 345 to locate and play video.

When a video consumer 345 selects multimedia content to play, the video service 330 take action based on the rules established according to the association data for playing that video. Thus, the actions will correspond to the rules described in the policy table 424. The actions include the video service 330 resolving any conflicting rules. The ownership service 320 may have already reduced the number of rules, or provided consolidated rules. All other issues of conflict are resolved. Once resolved, the video service 330 carries out the appropriate action, including one or more of:

Playing the requested multimedia content, in whole or part depending on the association data
   Not playing the requested multimedia content according to the policies for the association data.
   Paying royalties to one or more parties according to the policies for the association data.
   Recording advertising revenues to share with one or more parties according to the policies for the association data.
   Providing specific advertising according to the policies for the association data.
   There are numerous other actions that may be taken.

Note that while embodiments described above were for multimedia content that includes video and audio, e.g., movies, embodiments of the present can be adapted for many other media. Some or all elements described above can be applied to video-only, audio-only or still images. Assuming there is some concept of ownership and the ability to extract fingerprints, it could further be applied to any digital multimedia content. For example, software has ownership and fingerprints could be derived from various code segments. In particular, game software is common, and commonly includes media information. Embodiments of the present invention may therefore be used for work that includes software to which ownership is claimed.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps is implied, unless specifically stated.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in a server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are operated by a processing system of an ownership service. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries logic including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple items, (e.g., a centralized or distributed database, and/or associated caches and servers) that store the one or more sets of instructions. The term "carrier medium" shall also be taken to include any tangible medium that is capable of storing, encoding or carrying a set of instructions for execution by one or more of the processors and that cause the carrying out of any one or more of the methodologies of the present invention. A carrier medium may take many forms, including but not limited to, at least one non-volatile medium, and/or at least one volatile medium. A non-volatile medium includes, for example, an optical disk, a magnetic disk, and a magneto-optical disk. A volatile medium includes dynamic memory, such as main memory. For example, the term "carrier medium" shall accordingly be taken to included, but not be limited to, storage devices such as solid-state memories, or a computer product embodied in optical and magnetic media.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of an embodiment of the present invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A method comprising:
receiving possibly unknown digital content;
one of (i) ascertaining whether at least a part of the received digital content has previously been associated with one or more matched referenced works by having association data to the one or more matched referenced works, each matched referenced work being associated with corresponding ownership data and with at least one corresponding policy, or (ii) searching a store of fingerprint data of referenced works for a possibly inexact match with the received possible unknown digital content, each referenced work including digital content derived from one or more original works, each referenced work whose fingerprint data is in the store being associated with corresponding ownership data and with at least one corresponding policy,
the searching including:
  determining a fingerprint of at least part of the received digital content; and
  searching the store of fingerprint data of referenced works for a possibly inexact match with the received possible unknown digital content; and
in the case that the searching has produced a possibly inexact match to one or more matched referenced works, associating association data between the received digital content and the one or more matched referenced works,
wherein association data includes ownership data to the matched referenced works such that use of the digital content can take into account the ownership data and the one or more corresponding policies associated with the matched referenced works,
wherein the searching for a possibly inexact match produces a match for content that has been modified by at least one of editing, distorting, re-coding, mixing with other media, or compositing, and
wherein the determining the fingerprint includes determining a secure hash.

2. A method as recited in claim 1, wherein the received digital content includes multimedia content.

3. A method as recited in claim 1, wherein the received digital content includes game software.

4. A method as recited in claim 1, wherein the associating of the association data is executed in a secure manner.

5. A method as recited in claim 1, wherein the determining the fingerprint includes determining a fingerprint of one or more human-perceptible features.

6. A method as recited in claim 1, wherein the associating includes attaching the association data with the received digital content.

7. A method as recited in claim 1, wherein the associating includes attaching a reference to the association data with the received digital content.

8. A method as recited in claim 7, wherein the reference to the association data includes an indication of the location of the association data.

9. A method as recited in claim 1, further comprising:
adding one or more policies.

10. A method as recited in claim 9, wherein the one or more policies are added to the association data.

11. A method as recited in claim 9, further comprising:
in the case that more than one policy applies to the digital content, resolving any conflicts in policy applicable to the digital content.

12. A computer-readable storage medium configured with instructions that when executed by one or more processors cause carrying out a method comprising:
receiving possibly unknown digital content;
one of (i) ascertaining whether at least a part of the received digital content has previously been associated with one or more matched referenced works by having association data to the one or more matched referenced works, each matched referenced work being associated with corresponding ownership data and with at least one corresponding policy, or (ii) searching a store of fingerprint data of referenced works for a possibly inexact match with the received possible unknown digital content, each referenced work including digital content derived from one or more original works, each referenced work whose fingerprint data is in the store being associated with corresponding ownership data and with at least one corresponding policy,
the searching including:
  determining a fingerprint of at least part of the received digital content; and
  searching the store of fingerprint data of referenced works for a possibly inexact match with the received possibly unknown digital content; and
in the case that the searching has produced a possibly inexact match to one or more matched referenced works, associating association data between the received digital content and the one or more matched referenced works,
wherein association data includes ownership data to the matched referenced works such that use of the digital content can take into account the ownership data and the one or more corresponding policies associated with the matched referenced works,
wherein the searching for a possibly inexact match produces a match for content that has been modified by at least one of editing, distorting, re-coding, mixing with other media, or compositing, and
wherein the determining the fingerprint includes determining a secure hash.

13. A computer-readable storage medium as recited in claim 12, wherein the received digital content includes multimedia content.

14. A computer-readable storage medium as recited in claim 12, wherein the received digital content includes game software.

15. A computer-readable storage medium as recited in claim 12, wherein the associating of the association data is carried out executed in a secure manner.

* * * * *

UNITED STATES PATENT AND TRADEMARK OFFICE
CERTIFICATE OF CORRECTION

PATENT NO.       : 7,979,464 B2
APPLICATION NO.  : 11/734015
DATED            : July 12, 2011
INVENTOR(S)      : Seidel It is certified that error appears in the above-identified patent and that said Letters Patent is hereby corrected as shown below:

In Column 22, line 57, before "executed", kindly delete "carried out".

Signed and Sealed this
Ninth Day of August, 2011

David J. Kappos
*Director of the United States Patent and Trademark Office*